United States Patent Office 3,819,683
Patented June 25, 1974

---

3,819,683
N-ACYL CARBAMATE PRODUCTION
Hans Dieter Krebs, Heathmont, Victoria, and Mervyn Vero Leeding, Forest Hill, Victoria, Australia, assignors to ICI Australia Limited, Melbourne, Victoria, Australia
No Drawing. Filed May 4, 1972, Ser. No. 250,118
Claims priority, application Australia, May 24, 1971, 4,973/71; June 3, 1971, 5,089/71
Int. Cl. C07c 125/06
U.S. Cl. 260—479 C  11 Claims

ABSTRACT OF THE DISCLOSURE

Process for the preparation of N-acyl and N-aroyl carbamates by acylation with an acid halide.

---

This invention relates to processes for the manufacture of carbamate derivatives; in particular it relates to processes for the manufacture of N-acyl and N-aroyl carbamates.

It is known that acyl carbamates may be prepared by reacting carbamates with an acyl halide. Often such reactions are carried out in the presence of a base. Such processes suffer from the disadvantage that the time of reaction is prolonged—often of the order of 30 or more hours—if a product of reasonable purity and yield is desired. It has also been found despite the use of such prolonged reaction times, the presence of such base catalyst materials, or the use of elevated temperatures that undesirable amounts of unreacted carbamates or reaction by-products often remain in the resultant product. In attempts to reduce the reaction time of acylation it has also been proposed to react carbamates with acid anhydrides in the presence of a small amount of sulphuric acid. Such processes suffer from the commercial disadvantage that only half of the acylating agent is usefully employed in the preparation of the desired product whilst the remainder is converted to a contaminating carboxylic acid which is then separated from the desired product by an additional purification step.

We have now discovered a process whereby N-acyl and N-aroyl carbamates may be prepared in good yield and high purity in a time considerably less than has hitherto been possible and accordingly we provide a process for their preparation which process comprises reacting a carbamate with an acyl or an aroyl chloride or bromide in the presence of a catalytically effective amount of a metal or metals or derivatives of such metal or metals. From amongst the metals and metallic compounds which are useful in our process there may be mentioned tin, cobalt, aluminium and iron and derivatives thereof. Zinc and derivatives thereof are particularly useful in our process.

In an embodiment of our invention we provide a process of preparing acyl and aroyl carbamates of the general formula $R^1OCONR^2COR^3$ which process comprises reacting in the substantial absence of water a carbamate of the general formula $R^1OCONHR^2$ with an acyl or aroyl halide of the general formula $R^3COX$ wherein $R^1$ is selected from the group consisting of alkyl, alkenyl, alkynyl, cycloalkyl, phenyl optionally substituted with a group or groups Y, naphthyl, and an oxa-, thia- or aza-5- or 6-membered heterocyclic ring optionally condensed with a benzene ring, with the proviso that when $R^1$ is such a heterocyclic ring then said heterocyclic ring shall not contain an >NH group, and wherein Y is selected from the group consisting of alkyl, alkoxy, alkylthio, alkenyl, alkynyl, cycloalkyl, cycloalkenyl, alkenylthio, alkenyloxy, alkynloxy, alkynylthio, dialkylamino, aralkyl, aralkyloxy, aralkylthio, halo, haloalkyl and nitro; and wherein $R^2$ is selected from the group consisting of alkyl containing from 1 to 4 carbon atoms inclusive in the chain, cycloalkyl, aryl and aralkyl each optionally substituted; and wherein $R^3$ is selected from the group consisting of alkyl, alkenyl, aralkyl and aryl optionally substituted; and wherein X is chlorine or bromine; in the presence of a metal selected from the group consisting of tin, cobalt, aluminium and iron or a derivative of said metal.

In a further and preferred embodiment of our invention we prefer that our process be performed in the presence of zinc or a derivative of zinc. Accordingly, we provide a process as hereinbefore described for the preparation of carbamates of the general formula $R^1OCONR^2COR^3$ but wherein the said process is performed in the presence of zinc or a derivative of zinc, preferably a zinc halide such as zinc chloride or zinc bromide.

The nature of the carbamate used as a starting material in our process is not narrowly critical and from amongst carbamates suitable for use in this invention there may be mentioned for example:

phenyl N-methylcarbamate;
phenyl N-isopropylcarbamate;
phenyl N-butylcarbamate;
phenyl N-cyclohexylcarbamate;
phenyl N-benzylcarbamate;
phenyl N-phenylcarbamate;
3-methylphenyl N-methylcarbamate;
3-sec.butylphenyl N-methylcarbamate;
3-isopropylphenyl N-methylcarbamate;
3,4-dimethylphenyl N-methylcarbamate;
3,5-dimethylphenyl N-methylcarbamate;
3,5-diisopropylphenyl N-methylcarbamate;
3,5-ditert.butylphenyl N-methylcarbamate;
2-cyclopentenylphenyl N-methylcarbamate;
2-cyclohexylphenyl N-methylcarbamate;
2-cyclopent-2-enyl)phenyl N-methylcarbamate;
2-propargylphenyl N-methylcarbamate;
3-propargylphenyl N-methylcarbamate;
2-isopropoxyphenyl N-methylcarbamate;
2-isobutoxyphenyl N-methylcarbamate;
2,3-dimethoxyphenyl N-methylcarbamate;
2-chloro-4,5-dimethylphenyl N-methylcarbamate;
4-dimethylamino-3-methylphenyl N-methylcarbamate;
4-dimethylamino-3,5-dimethylphenyl N-methylcarbamate;
3,5-dimethyl-4-methylthiophenyl N-methylcarbamate;
3,(N,N-dimethylformamidino)-phenyl N-methylcarbamate;
1-naphthyl N-methylcarbamate;
2-methyl-2,3-dihydrobenzofuranyl-7 N-methylcarbamate;
2,2-dimethyl-2,3-dihydrobenzofuranyl-7 N-methylcarbamate;
benzothienyl-2 N-methylcarbamate;
5,6,7,8-tetrahydrotetralinyl-1 N-methylcarbamate;
isopropyl N-(3-chlorophenyl) carbamate;
sec.butyl N-ethylcarbamate;
allyl N-tertiarybutylcarbamate;
2-propynyl N-methylcarbamate;
2-ethylcyclohexyl N-methylcarbamate;
5-quinolyl N-methylcarbamate;
1-phenylethyl-4-piperidyl N-methylcarbamate;
3,6-dichloro-2-pyridyl N-methylcarbamate;
dibenzofuryl-2 N-methylcarbamate;
3-methyl-5-isopropylphenyl N-methylcarbamate;
2-butenylphenyl N-methylcarbamate;
3-allyloxyphenyl N-methylcarbamate;
4-allylthio-3,5-xylyl N-methylcarbamate;
3-(2-propynyloxy)phenyl N-methylcarbamate;
2-(2-propynylthio)phenyl N-methylcarbamate;
benzyl N-methylcarbamate;
3-benzyloxyphenyl N-methylcarbamate;
4-benzylthiophenyl N-methylcarbamate;

3-trifluoromethylphenyl N-methylcarbamate and 3-nitrophenyl N-methylcarbamate.

From amongst the acyl or aroyl chlorides and bromides suitable for use in this invention there may be mentioned for example acetyl chloride, acetyl bromide, propionyl chloride, butyryl chloride, isobutyryl chloride, crotonyl chloride, benzoyl chloride, phenylacetyl chloride. On the basis of their cost and availability the chlorides are more frequently used.

The preferred metals or metal derivatives for use in this invention are aluminium, cobalt, tin or zinc and derivatives of these metals; most preferred is zinc or derivatives of zinc. When derivatives of metals are used such derivatives may be wholly inorganic, for example a metal oxide such as zinc oxide or a metal halide such as zinc chloride, zinc bromide, aluminium chloride or cobaltous chloride. Alternatively such derivatives may be partly organic for example zinc carbonate or zinc acetate. Derivatives in the form of metal complexes are also useful. The amount of metal or metal derivative used in the process may vary widely and is dependent on the nature of the reactants and on the reaction conditions. Amounts as low as 0.1% w./w. based on the weight of carbamate originally present are useful and under most circumstances an amount in the range from 0.3 to 2.0% w./w. based on the weight of carbamate originally present is satisfactory. The amount of metal or metal derivative may be increased even further if desired and the upper limit is dictated mainly by cost rather than by technical considerations. However there is little advantage to be gained if the amount of metal or metal derivative is increased above about 10% w./w. of the weight of carbamate originally present in the reaction mixture. Although for most purposes the use of a single metal or metal derivative is satisfactory, a mixture of metals or their derivatives may be used in our process if desired.

The process may be performed using stoichiometric quantities of carbamate and acyl or aroyl chloride or bromide, but it is preferred that a slight excess of the halide be used. The reaction may be performed in the absence of a solvent for example when at least one of the reactants is a liquid at the chosen reactant temperature. However an inert solvent or a mixture of inert solvents may be used if desired. By an inert solvent we mean a solvent which does not react with the halide; thus, for example, water and hydroxylic solvents are excluded. It will be understood by those skilled in the art that the acyl and aroyl halides react with and thereby remove water. However, traces of water can be tolerated although they are wasteful of reagent. Included amongst suitable solvents there may be mentioned those of the aprotic type both non-polar and polar, for example aliphatic hydrocarbons such as hexane or petroleum ether; aromatic hydrocarbons such as benzene, toluene or xylene; and chlorinated hydrocarbons such as methylene dichloride or ethylene dichloride. The use of a solvent, or a mixture of solvents, in our process is often advantageous, for not only does it facilitate the bringing together of the reactants, but when used under conditions of reflux it enables a steady and predeterminable temperature of reaction to be maintained with the minimum of difficulty.

Our process has several advantages over those of the prior art. For example in a prior art process for the manufacture of 3-isopropyl-5-methylphenyl N - propionyl - N-methylcarbamate wherein 3-isopropyl-5-methylphenyl N-methylcarbamate was reacted with propionyl chloride in the presence of toluene it was found necessary to reflux the mixture for 60 hours before a product of reasonable purity could be obtained and even after this prolonged reaction time there were still a few percent of unreacted 3-isopropyl-5-methylphenyl N-methylcarbamate in the resultant product. Furthermore the yield of product based on the amount of carbamate originally present was only about 85%. By contrast when our process was carried out wherein the same reactants were used but there was added to the mixture before commencing the reaction an amount of 1% w./w. of zinc chloride based on the amount of carbamate originally present a near quantitative yield of high purity product was obtained with less than 1½ hours of reaction time at temperatures as low as 80° C. From this typical example it will be seen that our process affords purer products in higher yield in less time and at lower temperatures than was hitherto possible. Because of the purity of the products obtained there is the attendant advantage that less purification of the reaction product is necessary than hitherto to obtain a very pure material and this again lowers the cost of preparing the product.

Our invention is now illustrated by, but is not limited to, the following examples wherein all parts and percentages are on a weight basis unless otherwise specified. Examples numbered 14 to 16 inclusive are not within our invention and are included for the purposes of comparison.

EXAMPLE 1

Zinc powder (1 g.) was suspended in a solution of 3-methyl-5-isopropylphenyl N-methylcarbamate (1 mole) and butyryl chloride (1.1 moles) in ethylene dichloride (1000 ml.) and the mixture was stirred for 1.5 hours at 60° C., then cooled to room temperature, washed with water and dried over anhydrous sodium sulphate. The solvent and residual acid chloride were removed by distillation under reduced pressure. There was thus obtained as a faintly yellow liquid 3-methyl-5-isopropylphenyl N-butyryl-N-methylcarbamate in 95% yield and of high purity. Analysis by gas chromatography showed that less than 2% of isothymyl butyrate was present in the product so obtained. Analysis by infra red spectroscopy showed that much less than 1% of the original carbamate was present in the product so obtained.

EXAMPLE 2

The general procedure of Example 1 was repeated except that the zinc powder of that Example was replaced by a similar weight of zinc oxide. The product obtained was similar in yield and purity to that obtained in Example 1.

EXAMPLE 3

The general procedure of Example 1 was repeated except that the zinc powder of that Example was replaced by 2 g. of anhydrous zinc chloride. The product obtained was similar in yield and purity to that obtained in Example 1.

EXAMPLE 4

The general procedure of Example 3 was repeated except that in the present example no ethylene dichloride was used in the reaction mixture. The product obtained was similar in yield and purity to that obtained in Example 3.

EXAMPLE 5

The general procedure of Example 3 was repeated but the ethylene dichloride of that example was replaced by an equal volume of toluene, the temperature of reaction was at the reflux temperature of the mixture and the time of reaction was reduced to 40 minutes. The product obtained was similar in yield and purity to that obtained in Example 3.

EXAMPLE 6

The general procedure of Example 5 was repeated but the zinc chloride of that Example was replaced by an equal weight of anhydrous aluminium chloride. The product obtained was similar in yield and purity to that obtained in Example 5.

EXAMPLE 7

The general procedure of Example 5 was repeated but the zinc chloride of that Example was replaced by an equal weight of cobaltous chloride. The product obtained was similar in yield and purity to that obtained in Example 5.

EXAMPLE 8

The general procedure of Example 5 was repeated but the zinc chloride of that Example was replaced by 1 g. of tin powder. The product obtained was similar in yield and purity to that obtained in Example 5.

EXAMPLE 9

The general procedure of Example 4 was repeated but the zinc chloride of that Example was replaced by 2 g. of ferric chloride and the temperature of reaction was raised to 110° C. The product obtained was similar in purity to that of Example 4 in a yield of 63%.

EXAMPLE 10

A mixture of anhydrous zinc chloride (2 g.), 3-methyl-5-isopropylphenyl-N-methylcarbamate (1 mole), propionyl chloride (1.1 moles) and ethylene dichloride (500 ml.) was refluxed for one hour. The product so obtained was isolated by the general procedure of Example 1. Analysis confirmed that the product was highly pure 3-methyl-5-isopropylphenyl N - methyl-N-propionylcarbamate. The yield of product was 93%.

EXAMPLE 11

A mixture of anhydrous zinc chloride (2 g.), 3-methyl-5-isopropylphenyl N-methylcarbamate (1 mole), acetyl chloride (1.1 moles) and methylene dichloride (1000 ml.) was refluxed for two hours. After isolation by the general procedure of Example 1 there was obtained a 95% yield of 3-methyl-5-isopropylphenyl N-acetyl-N-methylcarbamate of high purity.

EXAMPLE 12

The general procedure of Example 11 was repeated but the zinc chloride of that Example was replaced by an equal weight of zinc acetate. The product obtained was similar in yield and purity to that obtained in Example 11.

EXAMPLE 13

A mixture of anhydrous zinc chloride (2 g.), 2-butenylphenyl N-methylcarbamate (1 mole), hexanoyl chloride (1.1 moles) and ethylene dichloride (500 ml.) was refluxed for 2 hours. A high yield of 2-butenylphenyl N-hexanoyl-N-methylcarbamate was obtained when the reaction product was isolated according to the general procedure of Example 1.

EXAMPLE 14

For the purposes of comparison a mixture of 3-isopropyl-5-methylphenyl N-methylcarbamate (1 mole), butyryl chloride (1.1 mole) and toluene (1 litre) was refluxed for 50 hours. After removing solvent under reduced pressure there was obtained a crude product containing 3-isopropyl-5-methylphenyl N-butyryl-N-methylcarbamate. Gas chromatographic analysis showed that this product contained about 15% of isothymylbutyrate.

EXAMPLE 15

For the purposes of comparison a mixture of 3-isopropyl-5-methylphenyl N-methylcarbamate (1 mole), butyryl chloride (1.1 moles), pyridine (1.2 moles), and toluene (1 litre) was refluxed for 20 hours. The product was filtered, washed with water to remove pyridine hydrochloride, dried over anhydrous sodium sulphate, and the toluene removed by distillation under reduced pressure. The crude yield of 5-methyl-3-isopropylphenyl N-methyl-N-butyrylcarbamate was 85%. Analysis by infra red spectroscopy of the crude product revealed the presence of about 3% of unreacted starting material, and gas chromatographic analysis indicated about 10% of isothymyl butyrate. The product was dark brown in colour.

EXAMPLE 16

For the purposes of comparison the general procedure of Example 1 was repeated except that the zinc powder of that example was omitted from the reaction mixture. The product so obtained contained approximately 30% of isothymol butyrate and approximately 30% of the carbamate originally present had remained unreacted.

EXAMPLE 17

The general procedure of Example 1 was repeated but in the present Example the reaction mixture was heated at reflux temperature for 1.5 hours. The yield and purity of the product so obtained was similar to that obtained in Example 1.

EXAMPLE 18

A mixture of anhydrous zinc chloride (2.4 g), dibenzofuryl-2 N-methylcarbamate (1 mole), cinnamyl chloride (1.1 moles) and ethylene dichloride (500 ml.) was refluxed for 4 hours. After isolation by the general procedure of Example 1 there was obtained a solid product which was shown by analysis to consist essentially of dibenzofuryl-2 N-cinnamyl-N-methylcarbamate.

EXAMPLE 19

A mixture of anhydrous zinc chloride (2.2 g.) 2-cyclohexylphenyl N-methylcarbamate (1 mole), benzoyl chloride (1.1 mole) and ethylene dichloride (500 ml.) was refluxed for 4 hours. After isolation by the general procedure of Example 1 there was obtained in high yield a faintly yellow oily liquid identified as 2-cyclohexylphenyl N-benzoyl-N-methylcarbamate. For comparative purposes the above reaction was repeated but the zinc chloride was omitted. The reaction under these comparative conditions yielded only a few percent of the desired product.

EXAMPLE 20

A mixture of anhydrous zinc chloride (2 g.), 3-nitrophenyl N-methylcarbamate (1 mole), acetyl chloride (1.1 moles) and ethylene dichloride (500 ml.) was refluxed for 2 hours. After isolation by the general procedure of Example 1 there was obtained in 91% yield a crystalline product of melting point 67 to 68° C. identified as 3-nitrophenyl N-acetyl-N1methylcarbamate. For comparative purposes the above reaction was repeated but the zinc chloride was omitted. The reaction under these comparative conditions yielded only a few percent of the desired product.

EXAMPLE 21

A mixture of anhydrous zinc chloride (3 g.), 3-trifluoromethylphenyl-N-methylcarbamate (1 mole), butyryl chloride (1.1 moles) and ethylene dichloride (500 ml.) was refluxed for 2 hours. After isolation by the general procedure of Example 1 there was obtained in high yield an amber coloured oil identified as 3-trifluoromethylphenyl N-butyryl-N-methylcarbamate.

When, for comparative purposes, the above reaction was repeated in the absence of zinc chloride there was no significant reaction between the carbamate and butyryl chloride used as starting materials.

EXAMPLE 22

The general procedure of Example 5 was repeated but the toluene of that example was replaced by an equal volume of hexane and the time of reaction was increased to 90 minutes. The product so obtained was similar in yield and purity to that obtained in Example 5.

EXAMPLE 23

The general procedure of Example 1 was repeated but the amount of zinc chloride was reduced to 0.6 g. The yield and purity of the product so obtained were similar to that obtained in Example 1.

EXAMPLE 24

Zinc powder (0.4 g.) was suspended in a solution of 3-methyl-5-isopropylphenyl N-methylcarbamate (1 mole) and butyrylchloride (1.1 moles) in ethylene dichloride (1000 ml.) and the mixture was refluxed for 2 hours. The product was isolated by the general method of Example 1 and there was thus obtained 3-methyl-5-isopropylphenyl N-butyryl-N-methylcarbamate in 93% yield and 95% purity.

EXAMPLE 25

The general procedure of Example 24 was repeated but the zinc powder of that example was replaced by 1 gram of anhydrous zinc chloride and the time of reflux was reduced to 1 hour. The product so obtained had a purity of 94% 3-methyl-5-isopropylphenyl N-butyryl-N-methylcarbamate and a yield of 95% was obtained.

EXAMPLE 26

The general procedure of Example 25 was repeated but the amount of zinc chloride was increased to 4.1 gram. The product so obtained had a purity of 96% 3-methyl-5-isopropylphenyl N-butyryl-N-methylcarbamate and was obtained in 95% yield.

EXAMPLE 27

Anhydrous zinc chloride (20.6 g.) was suspended in a solution of 3-methyl-5-isopropylphenyl N-methylcarbamate (1 mole) and butyrylchloride (1.1 moles) in ethylene dichloride (1000 ml.) and the stirred mixture was refluxed for two hours. The product was isolated by the general method of Example 1. There was thus obtained 3-methyl-5-isopropylphenyl N-butyryl-N-methylcarbamate in 94% yield and 96% purity.

EXAMPLE 28

A mixture of anhydrous zinc bromide (3.5 g.), 3-methyl-5-isopropylphenyl N-methylcarbamate (1 mole), acetyl bromide (1.1 moles) and ethylene dichloride (1000 ml.) was refluxed for three hours purging throughout with dry nitrogen. The product so obtained was isolated by the general procedure of Example 1. Analysis confirmed that the product was highly pure 3-methyl-5-isopropylphenyl N-acetyl-N-methylcarbamate. The yield of product was 93%.

EXAMPLE 29

The general procedure of Example 10 was repeated but the anhydrous zinc chloride of that example was replaced by a mixture consisting of zinc (1 g.) and anhydrous zinc chloride (1 g.). The yield and purity of the product so obtained were similar to those obtained in Example 10.

We claim:

1. In a process for the preparation of an N-acyl or N-aroyl carbamate which comprises reacting a carbamate with an acyl or aroyl chloride or bromide, the improvement wherein said reaction is carried out in the presence of a catalytically effective amount of at least one member of the group consisting of tin, cobalt, aluminum, iron, zinc and derivatives of said metals.

2. In a process for preparing acyl and aroyl carbamates of the general formula $R^1OCONR^2COR^3$ which comprises reacting in the substantial absence of water a carbamate of the general formula $R^1OCONHR^2$ with an acyl or aroyl halide of the general formula $R^3COX$ wherein $R^1$ is selected from the group consisting of alkyl, alkenyl, alkynyl, cycloalkyl, phenyl optionally substituted with a group or groups Y, naphthyl, and an oxa-, thia- or aza-5- or 6-membered heterocyclic ring optionally condensed with a benzene ring, with the proviso that when $R^1$ is such a heterocyclic ring then said heterocyclic ring shall not contain an >NH group, and wherein Y is selected from the group consisting of alkyl, alkoxy, alkylthio, alkenyl, alkynyl, cycloalkyl, cycloalkenyl, alkenylthio, alkenyloxy, alkynylthio, alkynyloxy, dialkylamino, aralkyl, aralkyloxy, aralkylthio, halo, haloalkyl and nitro; and wherein $R^2$ is selected from the group consisting of alkyl containing from 1 to 4 carbon atoms inclusive in the chain, cycloalkyl, aryl and aralkyl each optionally substituted; and wherein $R^3$ is selected from the group consisting of alkyl, alkenyl, aralkyl and aryl optionally substituted; and wherein X is chlorine or bromine; the improvement wherein said reaction is carried out in the presence of a metal selected from the group consisting of tin, cobalt, aluminum and iron or a derivative of said metal wherein the amount of said metal or metal derivative is not less than 0.1% w./w. based on the amount of carbamate originally present in the reaction mixture.

3. In a process of preparing acyl and aroyl carbamates of the general formula $R^1OCONR^2COR^3$ which comprises reacting in the substantial absence of water a carbamate of the general formula $R^1OCONHR^2$ with an acyl or aroyl halide of the general formula $R^3COX$ wherein $R^1$ is selected from the group consisting of alkyl, alkenyl, alkynyl, cycloalkyl, phenyl optionally substituted with a group or groups Y, naphthyl, and an oxa-, thia- or aza-5- or 6-membered heterocyclic ring optionally condensed with a benzene ring, with the proviso that when $R^1$ is such a heterocyclic ring then said heterocyclic ring shall not contain an >NH group, and wherein Y is selected from the group consisting of alkyl, alkoxy, alkylthio, alkenyl, alkynyl, cycloalkyl, cycloalkenyl, alkenylthio, alkenyloxy, alkynylthio, alkynyloxy, dialkylamino, aralkyl, aralkyloxy, aralkylthio, halo, haloalkyl and nitro; and wherein $R^2$ is selected from the group consisting of alkyl containing from 1 to 4 carbon atoms inclusive in the chain, cycloalkyl, aryl and aralkyl each optionally substituted; and wherein $R^3$ is selected from the group consisting of alkyl, alkenyl, aralkyl and aryl optionally substituted; and wherein X is chlorine or bromine; the improvement wherein said reaction is carried out in the presence of zinc, or a derivative of zinc wherein the amount of said zinc or zinc derivative is not less than 0.1% based on the amount of carbamate originally present in the reaction mixture.

4. A process according to claim 3 wherein the derivative of zinc is selected from the group consisting of zinc halides, zinc oxide, zinc carbonate and zinc acetate.

5. A process according to claim 3 wherein the derivative of zinc is zinc chloride.

6. A process according to claim 2 wherein the metal or metal derivative is present in an amount in the range from 0.3% to 2% w./w. based on the amount of carbamate originally present in the reaction mixture.

7. A process according to claim 3 wherein zinc or a zinc derivative is present in an amount in the range from 0.3% to 2% w./w. based on the amount of carbamate originally present in the reaction mixture.

8. A process according to claim 3 whereby a 3-methyl-5-isopropylphenyl N-acyl-N-methylcarbamate is prepared by reacting 3-methyl-5-isopropylphenyl N-methylcarbamate with an acyl chloride or an acyl bromide.

9. A process according to claim 3 whereby 3-methyl-5-isopropylphenyl N-acetyl-N-methylcarbamate is prepared by reacting 3-methyl-5-isopropylphenyl N-methylcarbamate is prepared by reacting 3-methyl-5-isopropylphenyl N-methylcarbamate with acetyl chloride.

10. A process according to claim 3 whereby 3-methyl-5-isopropylphenyl N-propionyl-N-methylcarbamate is prepared by reacting 3-methyl-5-isopropylphenyl N-methylcarbamate with propionyl chloride.

11. A process according to claim 3 whereby 3-methyl-5-isopropylphenyl N-butyryl-N-methylcarbamate is prepared by reacting 3-methyl-5-isopropyl N-methylcarbamate with butyryl chloride.

References Cited

Klobbie, Rec. Trav. Chim. Pays-Bas (1890), vol. 9, p. 142.

Ben-Ishai et al., J. Org. Chem. (1951), vol. 16, pp. 1025–1030.

Ocah, Friedel-Crafts and Related Reactions, Intersci., New York (1964), pp. 57, 58.

JAMES A. PATTEN, Primary Examiner

U.S. Cl. X.R.

260—287 R, 293.86, 295 CA, 295.5 C, 330.5, 346.2 R, 346.2 M, 471 C, 482 C